United States Patent [19]
Ferris

[11] Patent Number: 5,533,380
[45] Date of Patent: Jul. 9, 1996

[54] AUTOMATIC FORCE BALANCE CALIBRATION SYSTEM

[75] Inventor: Alice T. Ferris, Tabb, Va.

[73] Assignee: The United States of America as represented by the Administrator of the National Aeronautics and Space Administration, Washington, D.C.

[21] Appl. No.: 438,409

[22] Filed: May 10, 1995

[51] Int. Cl.$^6$ .................................................. G01L 25/00
[52] U.S. Cl. ............................................................ 73/1 B
[58] Field of Search ............................ 73/1 B, 1 C, 1 D

[56] References Cited

U.S. PATENT DOCUMENTS

| | | | |
|---|---|---|---|
| 3,759,082 | 9/1972 | Provenzano et al. | 73/1 B |
| 3,830,091 | 8/1974 | Sinsky | 73/1 D |
| 4,414,838 | 11/1983 | Ward et al. | 73/1 B |
| 5,279,144 | 1/1994 | Levkowitch | 73/1 B |

Primary Examiner—Robert Raevis
Attorney, Agent, or Firm—Kimberly A. Chasteen

[57] ABSTRACT

A system for automatically calibrating force balances is provided. The invention uses a reference balance aligned with the balance being calibrated to provide superior accuracy while minimizing the time required to complete the calibration. The reference balance and the test balance are rigidly attached together with closely aligned moment centers. Loads placed on the system equally effect each balance, and the differences in the readings of the two balances can be used to generate the calibration matrix for the test balance. Since the accuracy of the test calibration is determined by the accuracy of the reference balance and current technology allows for reference balances to be calibrated to within ±0.05%, the entire system has an accuracy of a ±0.2%. The entire apparatus is relatively small and can be mounted on a movable base for easy transport between test locations. The system can also accept a wide variety of reference balances, thus allowing calibration under diverse load and size requirements.

9 Claims, 4 Drawing Sheets

CALIBRATION INITIATION

403 —

ASSEMBLE ALL NECESSARY INFORMATION REQUIRED FOR CALIBRATION

1. Full Scale calibration loads and calibration loading sequence.
2. "No load" outputs of test and reference balances.
3. Physical dimensions of balances, adapters, and location of moment centers.
4. Reference balance calibration matrix and data acquisition system.

SETUP

406 —

1. Position all force applicators so test balance can be placed in the calibration apparatus with minimum change in output.
2. Install test balance in calibration system.
3. Perform fine adjustment of force applicators until test zero-load output is obtained.
4. Record this initial load condition.

CALIBRATION

409 —

1. Apply calibration loads.
2. Read output of test and reference balances at each point.
3. Record test and reference data.

DATA REDUCTION

412 —

1. Reduce the data to obtain the test balance calibration matrix.
2. Perform an error analysis to obtain the uncertainty of the test balance calibration.

FIG 4

AUTOMATIC FORCE BALANCE CALIBRATION SYSTEM

ORIGIN OF THE INVENTION

The invention described herein was made by an employee of the United States Government and may be manufactured and used by or for the Government for any governmental purpose without payment of any royalties thereon or therefor.

BACKGROUND OF THE INVENTION

The present invention relates to the field of precision force measurements systems. In particular, a system for automatic calibration of high precision force balances is provided.

Force balances consisting of strain gauges are widely used to measure forces encountered on a object when it is placed within a test environment. These balances are commonly used to measure three components of aggregate force: axial force, side force, normal (vertical) force, as well as rolling, yawing, and pitching moments. The use of force balances is widespread and includes applications in component stress tests including aerodynamic wind tunnel testing of loads.

Force balances are usually calibrated manually using a complex system of free hanging precision weights. Although this method is extremely accurate, the process is very complex and labor intensive, requiring from two to three man-weeks to complete a single calibration. Additionally, the use of gravity based loading causes difficulties when applying loads in all three orthogonal axes simultaneously—often leading to the development of large lever, cable and pulley based systems or a requirement that the entire calibration system be rotated.

In 1962, the National Aeronautics and Space Administration acquired a semi-automatic method for calibrating force balances. Similar designs were also developed by Carl Schenck AG (1989) in Germany and Israel Aircraft Industries (1991) in Israel and have subsequently been made commercially available in the United States. Each of these systems reduced the time involved in calibrating a balance to a single work shift (approximately eight man-hours); however, the new designs still had significant disadvantages.

First, each of the designs is quite large, complex and expensive. These calibration systems are not portable and must be installed at a fixed location.

Additionally, the system accuracy involved in these systems is difficult to determine. Since system accuracy is based on the accuracy of very high precision load cells, any complex load path from the cells and the force generators to the balance being calibrated makes alignment, deflection, and friction (or the changes in these properties) extremely critical factors in overall system performance. All of the automatic systems in the prior art can only infer system accuracy of between 0.1% and 0.2% by comparing their calibrations of test balances with calibrations performed using traditional gravity loads.

SUMMARY OF THE INVENTION

Accordingly, it is an object of the present invention to provide a calibration system which minimizes the load path of the test balance in order to prevent the need for realignment of either the test balance or the calibration system.

It is a further object to provide an automatic force balance calibration system which requires minimal user time to set up and operate.

A still further object is to provide a highly accurate calibration system which utilizes an extremely accurate path and derives overall system accuracy from the level of accuracy of a pre-calibrated reference balance.

A still further object of the present invention is to provide a relatively small, simple system such that the calibration equipment can be moved between sites as required by the user.

In accordance with these and other objects, the invention is a system for automatic calibration of force balances utilizing a pre-calibrated referenced balance to calibrate a new test balance. The reference balance and the test balance are connected such that the forces and moments applied during calibration pass through both balances. Particular care is taken to ensure that the adapter joining the two balances provides a precision reference between the two balances. The test balance may be calibrated simply by moving one end of the balance combination relative to the other end to induce calibration loads. As calibration loads are applied, the output of the strain gauges on each balance are read. The outputs from the reference balance are converted to loads through its precise calibration matrix and this reference load is used to define the load induced on the test balance. Multiple loads are applied to the test balance and the applied load and output from the test balance strain gauges are used to compute the test calibration matrix. The operation of the system can be automated to as large a degree as is wished. At one end of the spectrum, the operation may be entirely manual, with a technician applying the test loads, reading the resulting data and then computing the test calibration matrix. At the other end, computing equipment can be connected to the system to create a fully automatic system where the loads are applied, the data measured and stored, and the test calibration matrix reduced without any operator intervention.

BRIEF DESCRIPTION OF THE DRAWINGS

For a more complete understanding of the present invention and for further objects and advantages thereof, reference is now made to the following description taken in conjunction with the accompanying drawings in which:

FIG. 4 is a process flow chart for using the present invention.

DETAILED DESCRIPTION OF THE INVENTION

Figure 1:
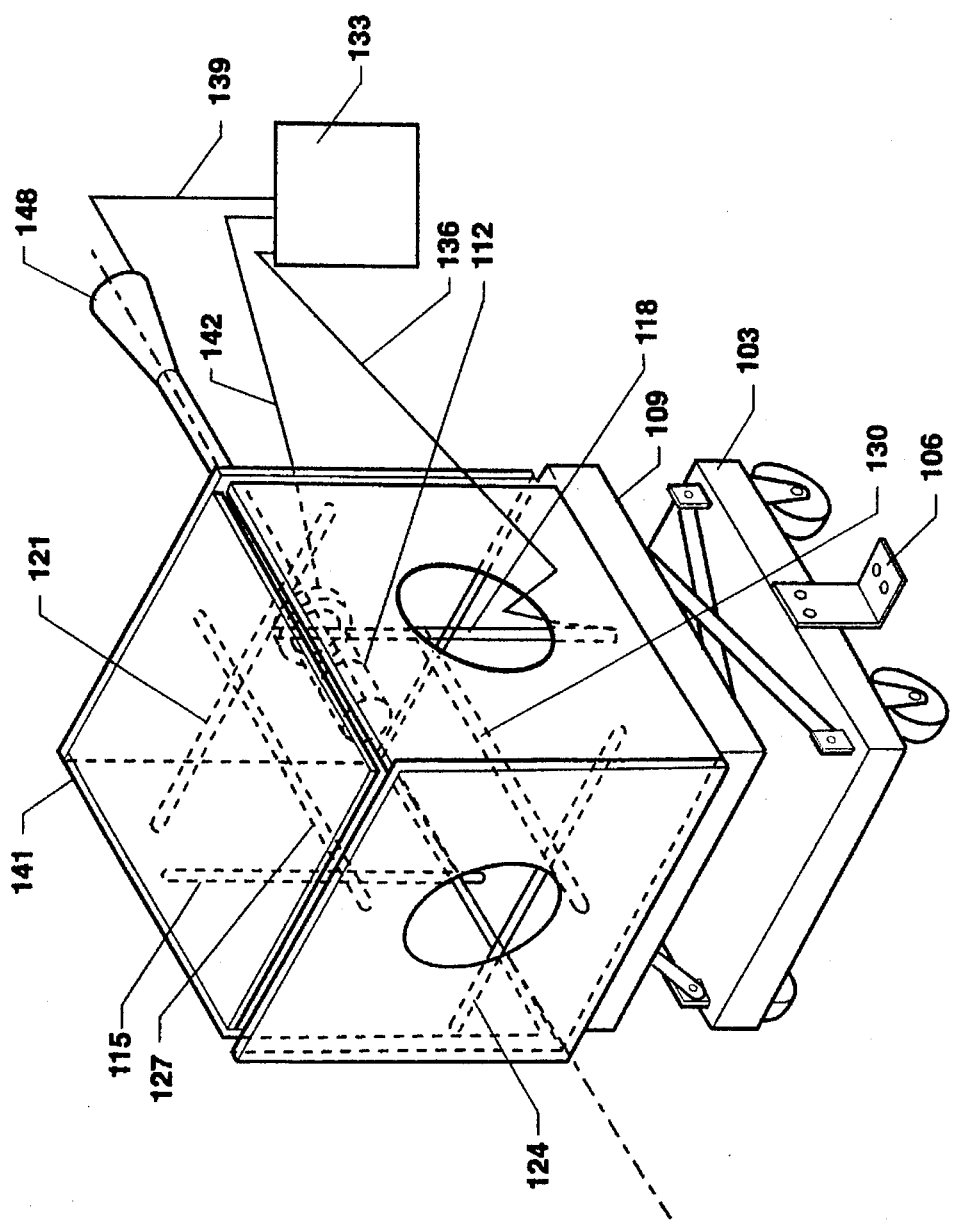
FIG. 1 is a depiction of a portable embodiment of the invention.

Referring now to the drawings, and in particular to FIG. 1, one embodiment of the present invention is depicted. Specifically, balance coupling mechanism 112 contains both the test and reference balances and is mounted on half shell 141 or any other equivalent mounting plate. Half shell 141 is rigidly connected by actuator control rods 115, 118, 121, 124, 127, and 130 to lockable base 109. Base 109 is further attached to mobility unit 103 which allows movement of the unit and can be locked in place through the use of anchor bracket 106. During calibration, test balance leads 139 are connected to the sting end of balance coupling mechanism 112 and monitor the output from the balance being calibrated. Reference balance leads 142 are connected directly to a connector at the mounting bracket of balance coupling mechanism 112 and monitor the output from the reference (pre-calibrated) balance. Test balance leads 139 and reference balance leads 142 provide readings from balance coupling mechanism 112 to system controller 133 which adjusts the forces and moments applied to balance coupling mechanism 112 by actuator control rods 115, 118, 121, 124, 127 and 130 electronically through actuator control leads 136. These actuator control rods are rigidly attached to both lockable base 109 and half shell 141. By adjusting the length of the actuator control rods, the orientation of half shell 141 with respect to lockable base 109 can be changed. The test and reference balances are rigidly attached to half shell 141 by balance coupling mechanism 112. Since sting end 148 of the balances is connected to a rigid support, changing the orientation of half shell 141 in relation to lockable base 109 applies force to both the test and reference balances. Thus, actuator control rods 115, 118, 121, 124, 127, and 130 can be used to apply the three linear forces and the three rotational moments. In particular, normal force is provided by simultaneously adjusting the lengths of actuator control rods 121 and 124. Axial force is provided by simultaneously adjusting the length of actuator control rods 127 and 130. Rotational moments are achieved by providing non-equal displacements in each pair of actuator control rods. In this case, actuator control rods 115 and 118 provide the rolling moment; actuator control rods 121 and 124 provide the yawing moment; and actuator control rods 127 and 130 provide the pitching moment. Appropriate software may be present on system controller 133 to allow full automation of the calibration procedure including applying test loads, measuring indicated loads on each balance, and computing the test balance calibration matrix.

Figure 2:
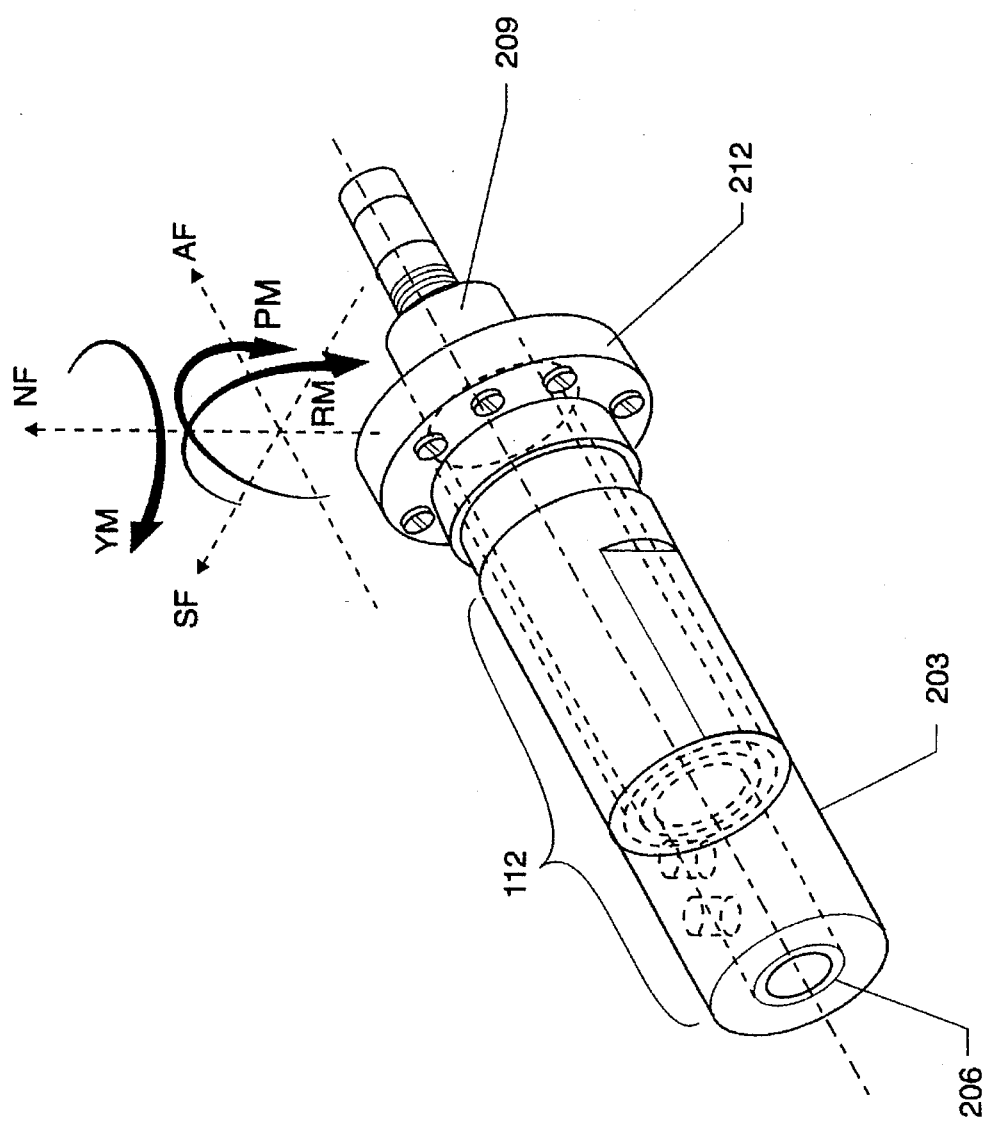
FIG. 2 is a depiction of the balance coupling mechanism.

Referring now to FIG. 2, balance coupling mechanism 112 is shown in detail. Balance coupling mechanism 112 comprises a reference balance 203 which has been specifically designed such that it has an interior cavity large enough to largely enclose test balance 209. Reference balance 203 and test balance 209 are joined at one end by rigid adapter sleeve 206. The opposing end of test balance 209 extends beyond the opposing end of reference balance 203 and is connected to a sting or other rigid support. The balance within a balance design is important because it allows the moment centers of the two balances to be brought into close alignment. When the two moment centers are very closely aligned, the moments and forces about the moment centers of the two balances are nearly identical. This allows the present invention to calibrate test balance 209 based on the readings provided by reference balance 203. Balance coupling mechanism 112 also has a mating ring 212 used to connect balance coupling mechanism 112 to the mobile test apparatus. The method of connecting balance coupling mechanism 112 to the mobile test apparatus is such that balance coupling mechanism 112 is rigidly attached to the section of the apparatus which is used to apply forces on balance coupling mechanism 112.

Figure 3:
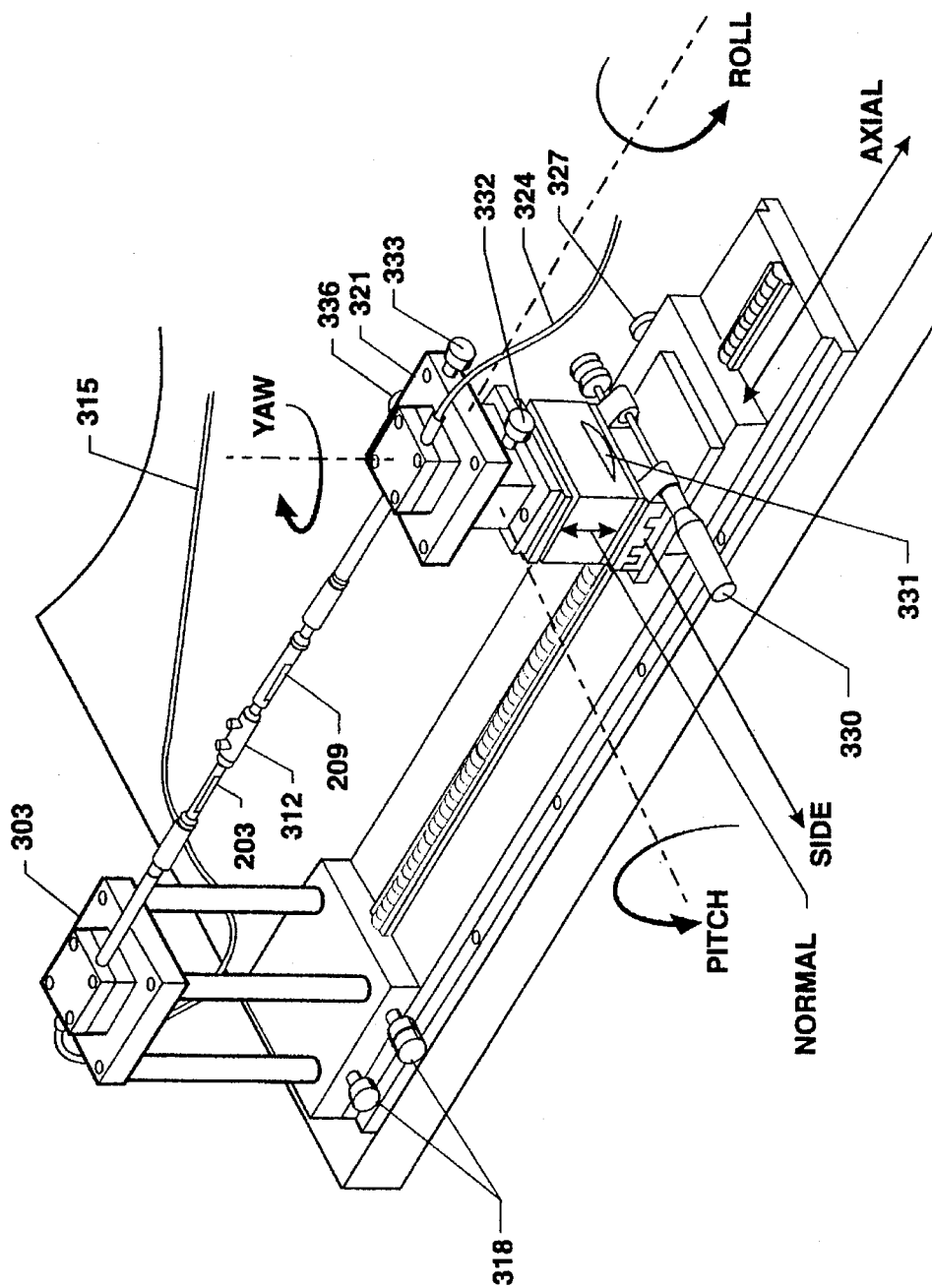
FIG. 3 is a depiction of an alternative embodiment of the invention.

Referring now to FIG. 3, an alternate embodiment of the present invention is depicted. In this embodiment, test balance 209 is connected at one end to reference balance 203 by rigid connector 312. Rigid connector 312 is rigidly secured to the model ends of reference balance 203 and test balance 209. When this combination is fixed at one end, any load applied at the opposite end must pass through and be measured by both balances. In this embodiment, the moment centers of the two balances are not closely aligned. The non-alignment of the moment centers means that the loads experienced by reference balance 203 must be much larger than those of test balance 209 in pitch and yaw in order to apply pure forces. This larger load range decreases the sensitivity of reference balance 203 at lower load levels. Reference balance 203 is also connected to rigid test adapter 303. Rigid test adapter 303 can be locked in place by lockdown screws 318 to prevent shifting of the calibrated end of the test apparatus during calibration. Cable 315, which extends through rigid test adapter 303 also provides electronic connectivity to the system controller. Test balance 209 is also connected to force generation unit 321. Force generation unit 321 is locked in place by several screws; however, these screws can be adjusted to provide the various forces and moments required to calibrate the test apparatus. Specifically, adjusting screw 327 moves force generation unit 321 along the axis of test balance 209 yielding axial force; adjusting screw 330 provides side force; and adjusting screw 331 provides normal force. Adjusting screws 332, 333, and 336 provide the pitching, rolling, and yawing moments respectively. Cable 324, which passes through force generation unit 321 provides electronic connectivity to the system controller.

Referring to FIG. 4, the procedure used to calibrate the test balance is shown. This procedure is the same regardless of the specific embodiment of the present invention used. In step 403, pre-work is completed prior to the initiation of the calibration process. This involves obtaining a reference balance in the proper load range with a valid precision calibration matrix, specifying the calibration loads and the loading sequence, determining the "no-load" outputs of the test and reference balances, and determining the physical dimensions of the balances. These steps are similar to the ones used in the prior art to calibrate balances using the gravity method.

In step 406, the calibration apparatus is set up. This includes setting the force applicators to initial values that allow the test balance to be placed in the apparatus while minimizing required adjustments to the force applicators, placing the test balance in the apparatus, and performing fine adjustments of the force applicators until the previously established "no-load" condition is reached.

In step 409, the test balance is calibrated against the reference balance. Specifically, the previously determined calibration loads are applied to both balances, and the output of both the test and the reference balances are recorded for each test load.

These results are used in step 412 where data is reduced to obtain the test balance calibration matrix. An error analysis may also be performed to determine the uncertainty in the test balance calibration.

The features and advantages of the invention are numerous. The reference balance is calibrated relative to a fixed attachment point as further related to the moment center of the balance. The adapter that connects the fixed point of reference balance to the corresponding fixed point of the test balance completely defines the load path and the alignment of the two balance axis systems. Since the reference balance and test balances are connected together, model end to model end, the load path between the two attachment points is minimized. A high precision, rigid adapter is used to connect the fixed points of both balances, thus making it unnecessary to realign or to mathematically correct for any deformation under load.

The design of the present invention is such that it can be placed in a small, mobile test system. Further, the use of simple adjusting controls and measuring systems allows the complete calibration process to be performed in a fast, efficient way by a technician. The speed of calibration can be further enhanced by using a computer control system to adjust the applied loads and measure the readings for each load. Furthermore, because the accuracy of the system is based upon the accuracy of a reference balance, the system provides a high level of accuracy. Reference balances can be designed, fabricated, and calibrated to within a two sigma accuracy of ±0.05% full scale in all axes. Even assuming a four-to-one ratio between the newly calibrated balance and the reference balance, the present invention will produce calibrations with an accuracy of ±0.2% full scale in all axes. As reference balances are more accurately calibrated, the present invention will benefit from their increased accuracy by producing higher accuracy calibrations. Additionally, multiple reference balances can be used to allow calibration over a wide range of load ranges and balance sizes.

It will be understood that many additional changes in the details, materials, steps and arrangement of parts, which have been herein described and illustrated in order to explain the nature of the invention, may be made by those skilled in the art within the principle and scope of the invention as expressed in the appended claims.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. A device for automatically calibrating force balances comprising:

a lockable base;

a reference balance having an attachment end and an opposing test end, the reference balance connected at the attachment end to said base;

a means for rigidly attaching a test balance, said means connected to the test end of said reference balance; and a means for simultaneously applying loads to the test end of said reference balance.

2. A device as in claim 1 wherein said attaching means comprises a rigid connector which is attached to the test end of said reference balance such that the test balance is rigidly connected to the opposite end of said connector in a state of axial alignment with said reference balance.

3. A device as in claim 1 wherein said reference balance is enlarged and hollow such that the test balance can be mounted on the interior cavity of said reference balance.

4. A device as in claim 3 wherein said attaching means comprises a rigid adapter sleeve rigidly connected to the test end of said reference balance and displaced within the interior of said reference balance.

5. A device as in claim 4 wherein said reference balance has a moment center which is closely aligned with the moment center of the test balance when the test balance is connected to said adapter sleeve.

6. A device as in claim 1 wherein said base further comprises a means for moving the device.

7. A device as in claim 1 wherein said means for applying loads further comprises:

a plurality of actuator control rods; and a mounting plate rigidly connected to the test end of said reference balance by said attaching means and movably connected to said base by said actuator control rods.

8. A device as in claim 7 wherein said plurality of actuator control rods further comprise a first pair of actuator control rods aligned parallel to said reference balance, a second pair of actuator control rods aligned perpendicular to said reference balance, and a third pair of actuator control rods aligned perpendicular to both said reference balance and said second pair of actuator control rods.

9. A device as in claim 1 further comprising:

a system controller;

reference balance leads electronically connected between said reference balance and said controller;

test balance leads electronically connected between said attaching means and said controller;

actuator control leads electronically connected between said load applying means and said controller; and software resident on said controller such that a series of load conditions can be selected by said controller and applied through said load applying means yielding balance results on said test data lines and said reference data lines.

* * * * *